United States Patent

[11] 3,602,451

[72] Inventor Dale P. Dolby
Mountain View, Calif.
[21] Appl. No. 24,579
[22] Filed Apr. 1, 1970
[45] Patented Aug. 31, 1971
[73] Assignee Ampex Corporation
Redwood City, Calif.

[54] MAGNETIC TAPE CASSETTE HUB
6 Claims, 3 Drawing Figs.

[52] U.S. Cl. .......... 242/74.2, 242/68.4, 242/197
[51] Int. Cl. .......... B65h 75/28
[50] Field of Search .......... 242/74.1, 74.2, 68.3, 74

[56] References Cited
UNITED STATES PATENTS 2,775,413 12/1956 Liebman et al. .......... 242/74.2
3,353,766 11/1967 Simon .......... 242/74.2

*Primary Examiner*—George F. Mautz
*Assistant Examiner*—Gregory A. Walters
*Attorney*—Robert G. Clay

ABSTRACT: A tape-winding hub is arranged with an axially directed slot for the insertion of the tape end, and an interior clamp is provided for the tape end substantially at the midpoint of the axial dimension of the hub, so that if the tape end is inserted slightly crookedly the error is overcome when the tape is wound under tension and an uneven tape pack is avoided. The tape clamp is operated by a simple pushbutton at the end of the hub. The hub is adapted for use in a cassette in such a way that it brakingly engages the cassette walls when the cassette is not in use to avoid tape spillage. The hub is also adapted to be engaged by means extending from a transport to release the brake and to center and position the hub independently of the cassette alignment and position.

INVENTOR.
DALE P. DOLBY
BY Robert G. Clay
ATTORNEY

MAGNETIC TAPE CASSETTE HUB

BACKGROUND OF THE INVENTION

This invention relates to magnetic tape recording and reproducing machines and particularly to winding hubs for the tapes thereof.

In copending U.S. Pat. applications Ser. No. 24,760 entitled "Cassette Feeding Apparatus," filed Apr. 1, 1970 by Alfred F. Stahler, and Ser. No. 24,763 entitled "Tape Positioning Apparatus" filed Apr. 1, 1970, by Bryan F. Kember, there is disclosed a magnetic tape cassette, a hub therefor arranged for braking against the cassette walls and for being engaged by centering, positioning and unbraking extension means carried by a tape transport, the hub having structure suitable for attaching an end of the tape thereto. The present invention is concerned with alternative hub structure adapted to perform the same functions whether as part of a cassette or merely as a tape winding hub that is not incorporated into a cassette.

Accordingly, it is an object of the present invention to provide an improved magnetic tape cassette hub.

It is another object to provide a cassette hub adapted to prevent spillage of tape.

It is a further object to provide a cassette hub adapted for precise positioning of the tape packs thereof in relation to a transport and independently of the cassette housing.

It is a still further object to provide tape-winding hub structure having improved means for attaching the end of the tape thereto.

SUMMARY OF THE INVENTION

A tape-winding hub is arranged with an axially directed slot for the insertion of the tape end, and an interior clamp is provided for the tape end substantially at the midpoint of the axial dimension of the hub, so that if the tape end is inserted slightly crookedly the error is overcome when the tape is wound under tension and an uneven tape pack is avoided. The tape clamp is operated by a simple pushbutton at the end of the hub. The hub is adapted for use in a cassette in such a way that it brakingly engages the cassette walls when the cassette is not in use to avoid tape spillage. The hub is also adapted to be engaged by means extending from a transport to release the brake and to center and position the hub independently of the cassette alignment and position.

DESCRIPTION OF THE DRAWINGS

FIG. 1 is a fragmentary cross-sectional plan view of a portion of a magnetic tape cassette showing a tape-winding hub and positioning mans therefor;

FIG. 3 is an enlarged fragmentary side view taken on the plane of lines 3—3 of FIG. 1, and illustrating the plane of lines 1—1 thereof on which FIG. 1 is taken.

DETAILED DESCRIPTION

Figures 1, 3:
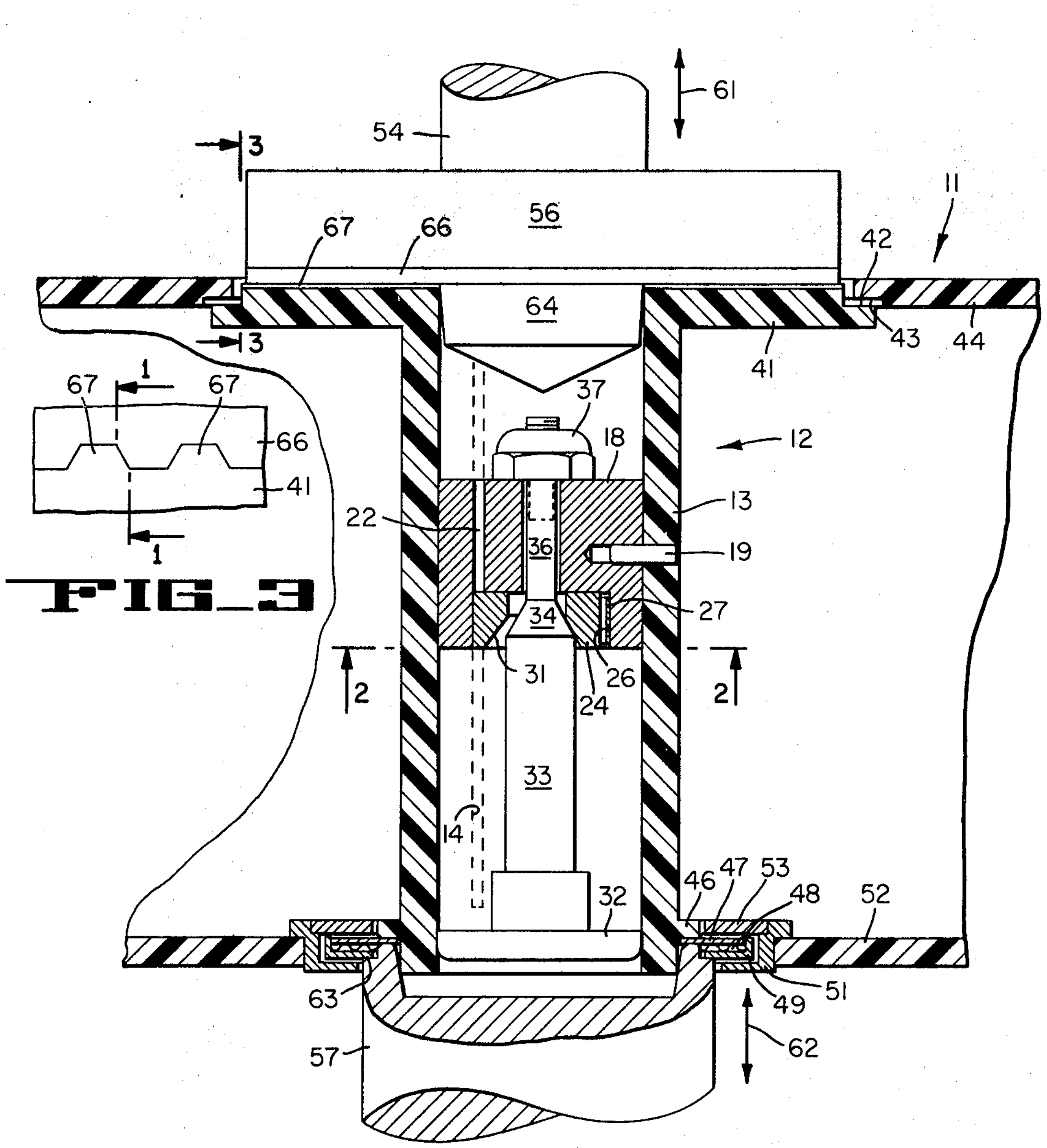
Figure 2:
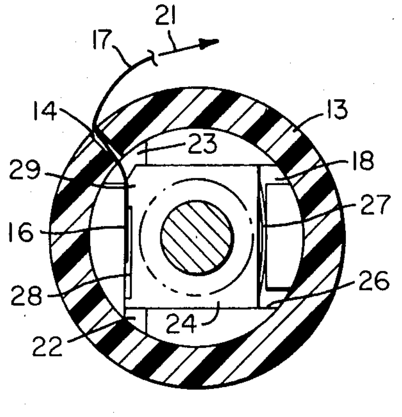
FIG. 2 is a cross-sectional view taken on the plane of lines 2—2 of FIG. 1.

As shown in FIGS. 1 and 2 a cassette 11 is provided with a magnetic tape-winding hub 12 including a hollow cylindrical tape-winding portion 13 having a slot 14 for inserting the end 16 of a magnetic tape 17. The portion 13 has an interior partition portion 18 which is substantially centrally located midway between the ends of the portion 13. The partition portion 18 may be integrally formed or molded with the portion 13, but as here shown is integrally and permanently joined thereto as by means of a press-fitted pin 19. As will be seen below, the reason for the central location of the partition portion 18 is to provide for centralized clamping of the tape end so as to permit it to align itself in an even tape pack when it is wound under tension illustrated by the direction of the arrow 21.

To provide for the clamp, the partition portion 18 is relieved to define a slot 22, which is terminated in funnel-shaped mouth 23 bracketing the inner opening of slot 14 and defining a continuation of slot 14 for guiding the tape end into the slot 22. A movable clamp jaw element 24 is positioned in a recess 26 in the portion 18 for sliding movement toward and away from the slot 22. The recess 26 opens into the slot 22 and the jaw element 24 is loaded as by a leaf spring 27 to move into the shot 22 and clamp the tape end 16 against the far wall of the slot 22. The jaw element 24 is relieved on the clamping side at 28 to define a clamping portion 29 having a smaller bearing area and therefore concentrating the clamping force move effectively.

It will be noted that the jaw element 24 is quite narrow compared with the width of the tape and is positioned centrally of the tape width. Consequently, if the tape end is somewhat crookedly inserted, i.e., so that the tape does not lie in a plane strictly normal to the axis of the hub, as often happens in practice, the tape is substantially free to twist a bit and align itself under normal winding tension into a plane that is precisely normal to the axis of the hub, and a smoothly wound tape pack is obtained.

For withdrawing the jaw 24 to windup the tape, the jaw element is provided with a conical-shaped bore 31 which is positioned in the jaw so as to be coaxial with the axis of the hub when the jaw is withdrawn out of the slot 22. A pushbutton 32 fitting into one end of the hollow portion 13, is provided with a rod element 33 which has a conical neck portion 34 engaging the bore 31 and operating as a cam to force the jaw element 24 into unclamping position when the pushbutton is pushed axially inwardly. The rod has an extension 36 passing through a suitable opening in the partition 18 and secured on the far side thereof as by a lock nut 37. It will be noted that the bore 31 and extension thereof are of sufficiently great diameter to permit the range of motion needed; and the pushbutton 32 is returned to clamping position upon release, as shown, by action of the spring 27.

To adapt the hub for use in a cassette, the portion 13 is provided at the end remote from the pushbutton 32 with a flange 41 having a steeped periphery 42 adapted for loosely fitting into a stepped opening 43 in the sidewall 44 of the cassette, so as to define a combination thrust and journal bearing. At the other end of the portion 13, an exterior flange 46 is provided spaced somewhat from the end of the hub. A collar 47 is fitted on the flange, and a spring 48 is mounted on the collar 47. A second flanged collar 49 is positioned on the other side of the spring and is adapted to be urged by the spring into axial engagement with a bearing member 51, that is mounted in the other sidewall 52 of the cassette. A cover plate 53 holds the assembly together when the hub is to be removed from the cassette.

As shown in the drawing, a drive shaft 54 and associated flange 56, and a centering shaft 57 are in position holding the flange 41 and the assembly including elements 13, 46, 47, 48 and 49 out of contact with the walls 44 and 52 and the elements 51 and 53. However, when the shafts 54 and 57 are retracted as illustrated by the arrows 61, 62, the spring 48 expands and forces element 49 into frictional contact with element 51, and flange 41 into frictional contact with wall 44 so that the hub is braked to prevent spillage of tape when the cassette is removed from the transport of which elements 54 and 57 are parts.

It will be noted that element 49 has sufficient interior clearance to permit the tubular wall of element 57 to surround the end of the hub for centering the hub, and to bear directly against element 47 and flange 46, while a shoulder 63 on element 57 engages element 49 to compress spring 48. At the other end of the hub, centering is provided by means of a tapered end 64 of the shaft 54, and for rotational driving of the hub, a pad 66 of resilient deformable material is mounted on the flange 56 and engages a number of radial teeth 67 formed on the flange 41, as illustrated in FIG. 3.

It will be understood that either element 54, 56 or element 57 may be fixed against movement in an axial direction so long as the other is movable, or both may be movable as illustrated.

What is claimed is:

1. A hub for a magnetic tape cassette, comprising:

a cylindrical tape-winding portion of generally hollow cylindrical shape but having an integral partition portion substantially centrally located in the hollow interior portion thereof;

said tape-winding portion including said partition portion thereof being formed with a tape end insertion slot extending axially across the tape-engaging portion of said tape-winding portion, and radially through the tape-winding portion into the hollow cylindrical interior thereof and substantially into said partition;

said partition portion being relieved to define a recess opening into said slot and fitted with a clamp jaw element slidable in said recess diametrically toward and away from said slot in said partition portion, said element being spring-loaded toward said slot to define with said slot a clamp for the end of said tape; and pushbutton cam means mounted in the hollow interior of said tape-winding portion and manually operable from one end of said tape-winding portion to cause sliding of said jaw element away from said slot to release the end of said tape.

2. A hub as described in claim 1, wherein:

said partition portion has a first central bore;

said clamp jaw element has a second central bore of substantially greater diameter than said first bore and aligning axially with said first bore in the unclamped condition of said jaw element;

said pushbutton cam means includes a pushbutton fitting in the opening of said tape-winding portion and having a rod element extending therefrom and through said first and second central bores;

said rod element having a conical-shaped portion confronting a conical-shaped portion of said second bore of said clamp jaw element;

whereby movement of said pushbutton axially inwardly causes unclamping of said tape end, and release of said pushbutton for return movement axially outwardly causes clamping of said tape end.

3. A hub as described in claim 2, wherein said cassette has a pair of spaced sidewalls, provided with a pair of opposed openings:

said openings and the ends of said tape-winding portion being shaped to cooperatively define a pair of loose fitting combination thrust and journal bearings for said tape-winding portion; and spring means being mounted between one end of said tape-winding portion and the adjacent sidewall of said cassette for causing frictional braking engagement of at least one sidewall and at least one end of said tape-winding portion;

said spring means having a portion accessible from the outside of said cassette for accepting axial thrust to disengage said spring means from said adjacent sidewall;

the other end of said tape-winding portion having a part accessible from the outside of said cassette for accepting axial thrust to disengage said other end from the other sidewall;

whereby said frictional braking engagement may be relieved during operation of said cassette.

4. A hub as described in claim 3, wherein:

both ends of said tape-winding portion are adapted for being journaled upon a predetermined centered axis, independently of said cassette sidewalls, during operation of said cassette, as by;

provision of an unobstructed centering orifice for said hollow interior portion of said tape-winding portion at the end thereof opposite from said pushbutton; and provision of an unobstructed centering journal-bearing surface on the exterior of said tape-winding portion at the end thereof at which said pushbutton is mounted.

5. A hub as described in claim 4, wherein;

said end of said tape-winding portion opposite side pushbutton is provided with an end flange defining the thrust-accepting part thereof, said flange terminating at the periphery in a stepped and shouldered portion mating loosely with a stepped and shouldered portion of the adjacent cassette sidewall to define the combination braking thrust and journal bearing therefor;

the end of said tape-winding portion adjacent the pushbutton being provided with an exterior flange spaced from the end to define the unobstructed centering exterior journal-bearing surface and to mount the spring means; and the spring mans being provided in generally tubular, axially compressible form, bearing with one end against said exterior flange and having the other end bearing axially against an inner portion of the adjacent cassette sidewall at the outer periphery of said tubular spring means, the inner periphery of said spring means being however exposed, by one of said openings in the adjacent cassette sidewall, to thrust from the exterior of said cassette, and said inner periphery of said spring means also being radially spaced from said centering journal-bearing surface to leave said surface unobstructed.

6. A hub as described in claim 5, wherein:

said end flange is adapted to mate with a deformable plastic driving element, as by providing the axially outward facing side of said end flange with:

a plurality of alternating raised and recessed portions for ensuring positively gripping and rotationally driving engagement with mating surfaces of said deformable plastic driving member.